(12) United States Patent
Saad et al.

(10) Patent No.: US 12,236,260 B1
(45) Date of Patent: Feb. 25, 2025

(54) CONFIGURABLE ADDRESS DECODER

(71) Applicant: Amazon Technologies, Inc., Seattle, WA (US)

(72) Inventors: Dan Saad, Herut (IL); Guy Nakibly, Kedumim (IL); Lev Vaskevich, Hertsliya (IL); Aviv Bonomo, Tel Aviv (IL)

(73) Assignee: Amazon Technologies, Inc., Seattle, WA (US)

( * ) Notice: Subject to any disclaimer, the term of this patent is extended or adjusted under 35 U.S.C. 154(b) by 590 days.

(21) Appl. No.: 17/643,572

(22) Filed: Dec. 9, 2021

(51) Int. Cl.
*G06F 9/46* (2006.01)
*G06F 9/54* (2006.01)

(52) U.S. Cl.
CPC .............. *G06F 9/466* (2013.01); *G06F 9/54* (2013.01); *G06F 2209/543* (2013.01)

(58) Field of Classification Search
None
See application file for complete search history.

(56) References Cited

U.S. PATENT DOCUMENTS

| 10,911,292 | B1 * | 2/2021 | Bshara ................... H04L 41/12 |
| 11,640,366 | B1 | 5/2023 | Saad et al. |
| 2013/0290582 | A1 | 10/2013 | Kothamasu et al. |
| 2014/0237156 | A1 * | 8/2014 | Regula ................ G06F 13/4022 |
| | | | 710/314 |
| 2015/0012679 | A1 | 1/2015 | Davis et al. |
| 2015/0169495 | A1 | 6/2015 | Zheng |
| 2017/0168954 | A1 | 6/2017 | Meyer et al. |
| 2017/0315944 | A1 | 11/2017 | Mayer et al. |
| 2020/0039524 | A1 | 2/2020 | Chu |
| 2020/0192859 | A1 | 6/2020 | Jones et al. |
| 2020/0264901 | A1 | 8/2020 | Camarota et al. |
| 2023/0367510 | A1 | 11/2023 | Fishwick et al. |

OTHER PUBLICATIONS

U.S. Appl. No. 17/457,812, filed Dec. 6, 2021, Saad et al.
U.S. Appl. No. 17/643,127, filed Dec. 7, 2021, Nakibly et al.
U.S. Notice of Allowance dated Dec. 21, 2023 in U.S. Appl. No. 17/643,127.
U.S. Notice of Allowance dated Jan. 6, 2023 in U.S. Appl. No. 17/457,812.

* cited by examiner

*Primary Examiner* — Adam Lee
(74) *Attorney, Agent, or Firm* — Weaver Austin Villeneuve & Sampson LLP (57) ABSTRACT

An address decoder for a system is disclosed that can be used for different source nodes in the system. Each address decoder can be configured to perform a plurality of decode methods that can be customized for each source node. A first decode method can be used to determine a target node from a plurality of target nodes based on a destination address of the transaction. A second decode method can be used to assign a dedicated target node as the target node irrespective of the destination address of the transaction. The second decode method can be used to route the transaction to the dedicated target node for testing and verification operations.

20 Claims, 7 Drawing Sheets

CONFIGURATION REGISTER
400

| FORCED TARGET ID(s) 400c | FORCED TARGET ENABLE 400b | DECODE METHOD SELECT 400a |
|---|---|---|

FIG. 4B

TN WINDOWS CONTROL REGISTER
402

| TN7 DECODE WINDOW ENABLE 402g | TN6 DECODE WINDOW ENABLE 402f | TN5 DECODE WINDOW ENABLE 402e | TN4 DECODE WINDOW ENABLE 402d | TN3 DECODE WINDOW ENABLE 402c | TN2 DECODE WINDOW ENABLE 402b | TN1 DECODE WINDOW ENABLE 402a |
|---|---|---|---|---|---|---|

FIG. 4C

SN PARAMETERS REGISTER
404

| TN7 DECODE WINDOW SELECT 404g | TN6 DECODE WINDOW SELECT 404f | TN5 DECODE WINDOW SELECT 404e | TN4 DECODE WINDOW SELECT 404d | TN3 DECODE WINDOW SELECT 404c | TN2 DECODE WINDOW SELECT 404b | TN1 DECODE WINDOW SELECT 404a |
|---|---|---|---|---|---|---|

| SYSTEM DECODE WINDOWS 502 |
|---|
| TN1 DECODE WINDOW: 0x0000-0x01FF |
| TN2 DECODE WINDOW: 0x0200-0x02FF |
| TN3 DECODE WINDOW: 0x0300-0x03FF |
| TN4 DECODE WINDOW: 0x0400-0x04FF |
| TN5 DECODE WINDOW: 0x0500-0x05FF |
| TN6 DECODE WINDOW: 0x0600-0x06FF |
| TN7 DECODE WINDOW: 0x0700-0x07FF |

FIG. 5A

| FIRST SET OF DECODE WINDOWS 504 |
|---|
| TN1 DECODE WINDOW: 0x0000-0x01FF |
| TN2 DECODE WINDOW: 0x0200-0x02FF |
| TN5 DECODE WINDOW: 0x0500-0x05FF |
| TN7 DECODE WINDOW: 0x0700-0x07FF |

FIG. 5B

| SECOND SET OF DECODE WINDOWS 506 |
|---|
| TN4 DECODE WINDOW: 0x0400-0x04FF |
| TN5 DECODE WINDOW: 0x0500-0x05FF |
| TN6 DECODE WINDOW: 0x0600-0x06FF |
| TN7 DECODE WINDOW: 0x0700-0x07FF |

FIG. 5C

| FIRST SET OF TARGET NODE IDS 508 |
|---|
| TN1 ID: 0x0001 |
| TN2 ID: 0x0002 |
| TN3 ID: 0x0003 |
| AD ID: 0x0004 |

FIG. 5D

| SECOND SET OF TARGET NODE IDS 510 |
|---|
| TN4 ID: 0x0001 |
| TN5 ID: 0x0002 |
| TN6 ID: 0x0003 |
| TN7 ID: 0x0004 |

CONFIGURABLE ADDRESS DECODER

BACKGROUND

Some systems may include multiple source nodes which may be connected to different target nodes via one or more interconnect fabrics. In most cases, each source node may have access to a different set of target nodes with different address ranges. Thus, the transactions issued by each source node may have to traverse through various interconnect fabrics to reach the desired target nodes.

BRIEF DESCRIPTION OF THE DRAWINGS

Various embodiments in accordance with the present disclosure will be described with reference to the drawings, in which.

DETAILED DESCRIPTION

A system may include multiple source nodes and target nodes, e.g., CPUs, memory (e.g., SRAMs, DRAMs, register files, etc.), direct memory access (DMA) controllers, input/output (I/O) devices (e.g., I/O controllers, Peripheral Component Interconnect express (PCIe) devices, network controllers, SATA devices, flash, UARTs, USB devices, UARTs, USARTs, etc.), and coprocessors (e.g., accelerator engines, crypto engines, graphics processing units (GPUs), audio processors, etc.). Various source nodes and the target nodes may be connected via one or more interconnect fabrics (or simply interconnects). For example, the system may be a system-on-a-chip (SoC) comprising one or more processor cores, memory, input/out (I/O) devices, coprocessors, and other components to support functionalities that demand high performance and compute power such as cloud computing, databases, application hosting, machine learning, among others. In some examples, the system can be a multi-chip system comprising multiple such SoCs.

Each source node in the system may be coupled to an address decoder to direct the transactions to a desired target node. Generally, each source node may have access to a different set of target nodes through a different interconnect, and each target node may be mapped to a specific address range. In some cases, a transaction may have to traverse through several interconnects to reach the target node, and each interconnect may use dedicated address decoders to route the transaction to the appropriate target node. In some systems, various address decoders may be integrated into a single address decoder to provide decoding for different target nodes through a single interconnect; however, the integrated address decoder or the integrated interconnect can degrade the system timing and increase the chip area, and may not be a cost effective solution. Thus, it may be desirable to have a single decoder design that can be used for all the source nodes across all the interconnects in the system.

Embodiments can provide a single address decoder design that can be configured for different source nodes and interconnects. The address decoder can be implemented using a flexible design that relies on an external system configuration that is common to all the source nodes, and an internal configuration that is specific to a source node associated with the address decoder. Each address decoder may store a default internal configuration in a memory, which can be overwritten at reset with external override values that are specific to a source node associated with that address decoder. The external system configuration may include system decode windows comprising a respective decode window for each target node from the plurality of target nodes. For example, each target node may be mapped to an address range that may represent a decode window for the address decoder. Each address decoder can be configured to select a certain set of decode windows from the system decode windows that corresponds to a set of target nodes from the plurality of target nodes that the source node is allowed to access.

In some embodiments, the address decoder can support a plurality of decode methods, and a decode method from the plurality of decode methods can be selected to determine a target node for a given transaction based on the internal configuration of the address decoder and transaction information associated with the transaction. The address decoder can also generate a target node identifier (ID), which can be used by an interconnect coupled to the address decoder to route the transaction to the target node. In some examples, the transaction can traverse through multiple interconnects before reaching the target node using appropriate target IDs tied to each interconnect. For example, the address decoder coupled to each interconnect on the path of the transaction can assign a respective target ID to route the transaction to the desired target node.

In a first decode method from the plurality of decode methods, a target node can be determined based on whether a destination address of the transaction corresponds to a decode window from the set of decode windows allocated to the source node associated with the address decoder. In a second decode method from the plurality of decode methods, a dedicated target node can be assigned as the target node irrespective of the destination address of the transaction. As an example, if the Advanced extensible Interface (AXI) protocol is used to communicate the transaction between the source node and the target node, the dedicated target node can be assigned based on the AXI USER bits. In some examples, the second decode method can be used to route the transaction to a pre-determined memory space corresponding to the dedicated target node for testing or verification operations. The address decoder can support overriding the target node ID for routing the transaction to the dedicated target node through one or more interconnects.

The internal configuration for each address decoder can be updated at reset based on the source node, which can provide flexibility with selecting a set of decode windows corresponding to the set of target nodes the source node is allowed to access, enabling or disabling various decode windows in the set of decode windows, or manipulating the target node IDs to route the transactions to a specific target node. Thus, by overriding the default reset values for the internal configuration of each address decoder, the same address decoder design can be instantiated for most or all the source nodes across the system irrespective of the interconnects.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
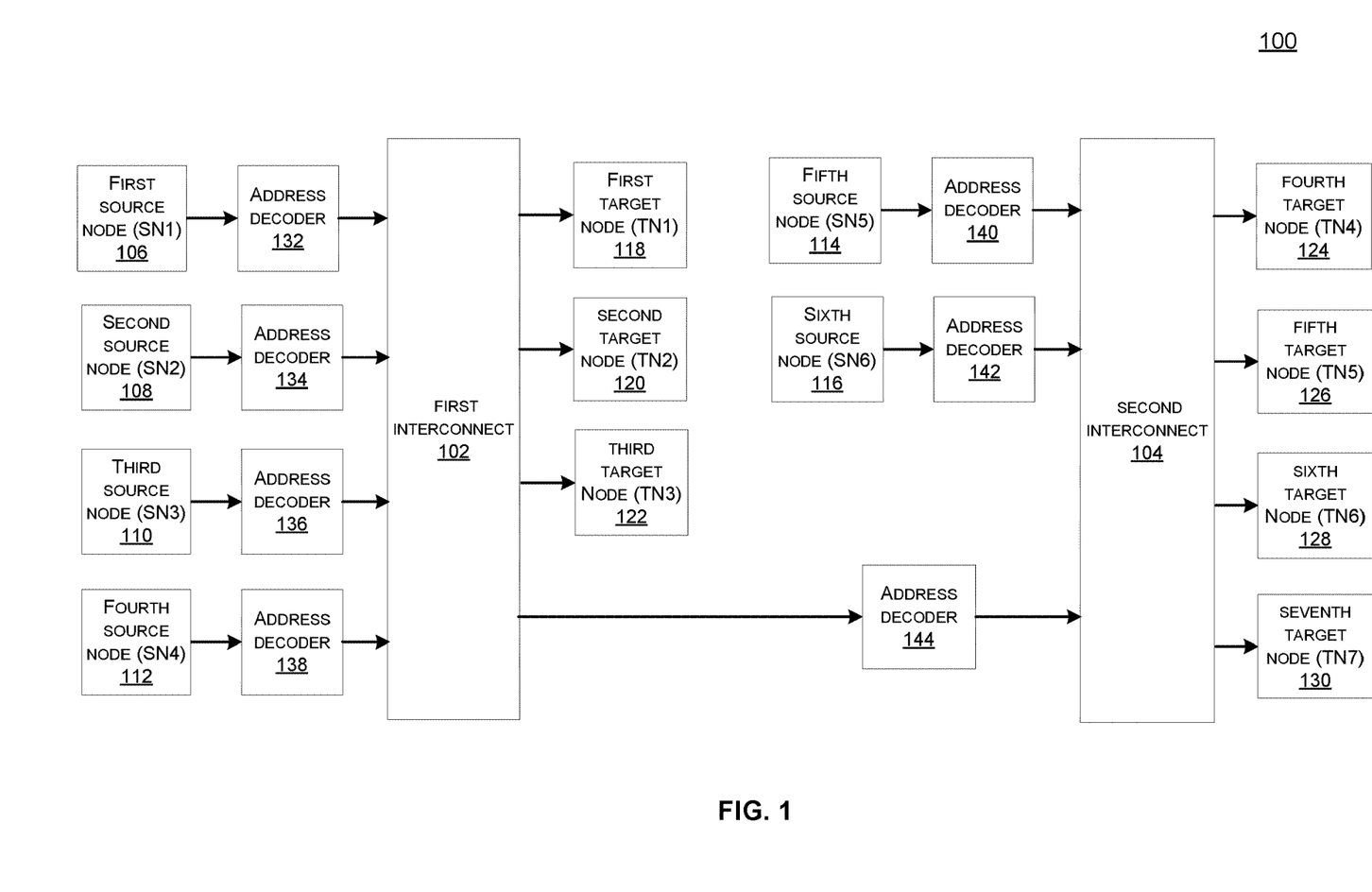
FIG. 1 illustrates a system comprising a plurality of address decoders coupled to a plurality of source nodes and to a plurality of target nodes, in some embodiments.

FIG. 1 illustrates an example system 100 comprising a plurality of address decoders coupled to a plurality of source nodes and to a plurality of target nodes. The plurality of source nodes and the plurality of target nodes may include CPUs, memory (e.g., SRAMs, DRAMs, register files, etc.), DMA controllers, I/O devices (e.g., I/O controllers, Peripheral Component Interconnect express (PCIe) devices, network controllers, SATA devices, flash, UARTs, USB devices, UARTs, USARTs, etc.), and coprocessors (e.g., accelerator engines, crypto engines, graphics processing units (GPUs), audio processors, etc.). In some embodiments, an address decoder instance may be used for each source node to direct the transactions issued by the source node to the desired target node via the one or more interconnects. In some examples, the system 100 may be part of one or more system-on-chips (SoCs), which can support functionalities that demand high performance and compute power such as cloud computing, databases, application hosting, machine learning, among others.

As shown in FIG. 1, the system 100 may include a plurality of source nodes comprising a first source node (SN1) 106, a second source node (SN2) 108, a third source node (SN3) 110, a fourth source node (SN4) 112, a fifth source node (SN5) 114, and a sixth source node (SN6) 116. The SN1 106 may be associated with an address decoder 132, the SN2 108 may be associated with an address decoder 134, the SN3 110 may be associated with an address decoder 136, the SN4 112 may be associated with an address decoder 138, the SN5 114 may be associated with an address decoder 140, and the SN6 116 may be associated with an address decoder 142.

The address decoders 132-138 may be coupled to a first interconnect 102, and the address decoders 140-142 may be coupled to a second interconnect 104. The system 100 may also include a plurality of target nodes comprising a first target node (TN1) 118, a second target node (TN2) 120, a third target node (TN3) 122, a fourth target node (TN4) 124, a fifth target node (TN5) 126, a sixth target node (TN6) 128, and a seventh target node (TN7) 130. The TN1 118, TN2 120, and the TN3 122 may be coupled to the first interconnect 102, and the TN4 124, TN5 126, TN6 128, and the TN7 130 may be coupled to the second interconnect 104. In some embodiments, an address decoder 144 may be configured to operate as a target node for the first interconnect 102, and as a source node for the second interconnect 104. In some examples, the first interconnect 102 can be on a first SoC, and the second interconnect 104 can be on a second SoC in a multi-chip system.

The first interconnect 102 and the second interconnect 104 may be implemented using meshes, rings, crossbars, nodes, switches, bridges, or other suitable components. In some implementations, the first interconnect 102 and the second interconnect 104 may support the Advanced Micro controller Bus Architecture (AMBA) Advanced extensible Interface (AXI) protocol, or AXI Coherency Protocol Extension (ACE) protocol for communication between the source nodes and the target nodes.

Embodiments can allow using a single address decoder design, which can be customized for different source nodes by overwriting, in hardware, the default internal configuration of each address decoder instance with an override internal configuration that is specific to the corresponding source node. For example, at power-up, each of the address decoders 132-144 may store a same default internal configuration in a local memory. In some embodiments, an external input with an override internal configuration that is specific to a source node can be overwritten in the local memory of the corresponding address decoder. As an example, the default internal configuration of the address decoder 132 can be overwritten with specific override internal configuration associated with the SN1 106, the default internal configuration of the address decoder 140 can be overwritten with specific override internal configuration associated with the SN5 114, and so on.

In some embodiments, each address decoder from the address decoders 132-144 can be configured to route a transaction issued by a corresponding source node to a target node based on an external configuration, and an internal configuration that is specific to the corresponding source node. This is further explained with reference to FIG. 2.

Figure 2:
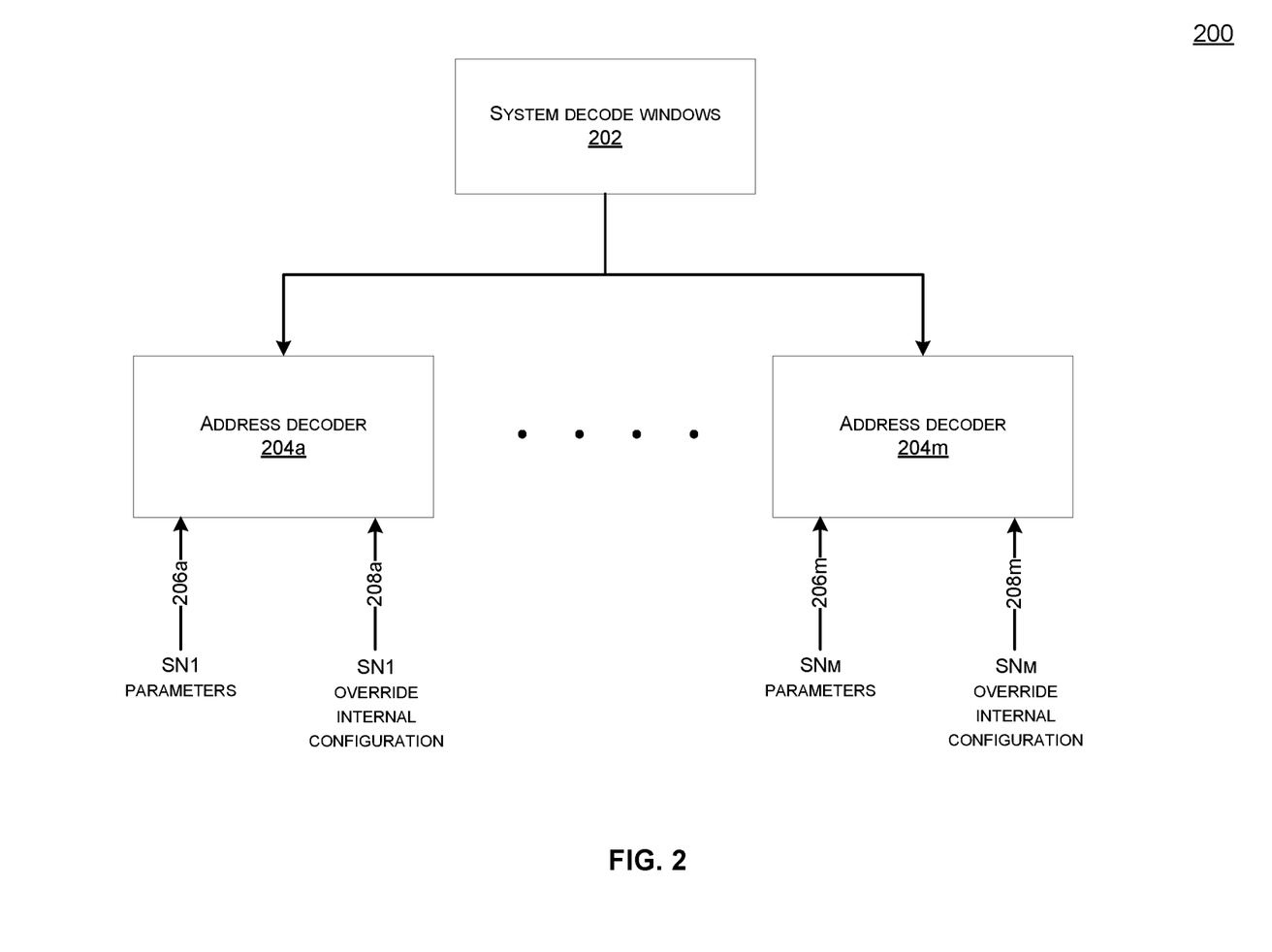
FIG. 2 illustrates an external configuration and an internal configuration of each address decoder according to some embodiments.

FIG. 2 illustrates external configuration and internal configuration of each address decoder according to some embodiments.

The external configuration may include system decode windows 202 comprising a plurality of decode windows. Each decode window in the plurality of decode windows may be associated with a corresponding target node from a plurality of target nodes. As shown in FIG. 2, the system decode windows 202 can be common to all the M address decoders comprising an address decoder 204a through an address decoder 204m. Referring back to FIG. 1, the address decoder 132 can be an example of the address decoder 204a, and the address decoder 144 can be an example of the address decoder 204m (e.g., M=7). Each decode window in the system decode windows 202 may represent a respective address range allocated to a corresponding target node from the target nodes 118-130.

Each of the M address decoders may be configured to select a set of decode windows from the system decode windows 202 based on a respective set of parameters. As shown in FIG. 2, the address decoder 204a may be configured to select a first set of decode windows from the system decode windows 202 based on SN1 parameters 206a associated with a first source node, and the address decoder 204m may be configured to select an Mth set of decode windows from the system decode windows 202 based on SNm parameters 206m associated with an Mth source node. The first set of decode windows may include a respective address range for each target node that the first source node is allowed to access, and the Mth set of decode windows may include a respective address range for each target node that the Mth source node is allowed to access.

In some embodiments, each of the M address decoders 204a-204m may store a default internal configuration in a respective local memory, which can be overwritten at system reset with an override internal configuration using an external input that is specific to a source node associated with that address decoder. For example, a default internal configuration stored in a memory of the address decoder 204a may be overwritten at system reset with an SN1 override internal configuration 208a associated with a first source node, and a default internal configuration stored in a memory of the address decoder 204m may be overwritten at reset with an SNm override internal configuration 208m associated with an Mth source node. In some embodiments, the SN1 override internal configuration 208a and the SNm override internal configuration 208m may include vectors that can overwrite the default internal configuration stored in memory of the address decoder 204a and the address decoder 204m, respectively, in hardware.

Thus, some embodiments can support overriding the default internal configuration of each of the M address decoders, with a customized internal configuration that is specific to each source node associated with the given address decoder, which can allow using the same address decoder for all the source nodes across the system irrespective of the interconnects.

Figure 3:
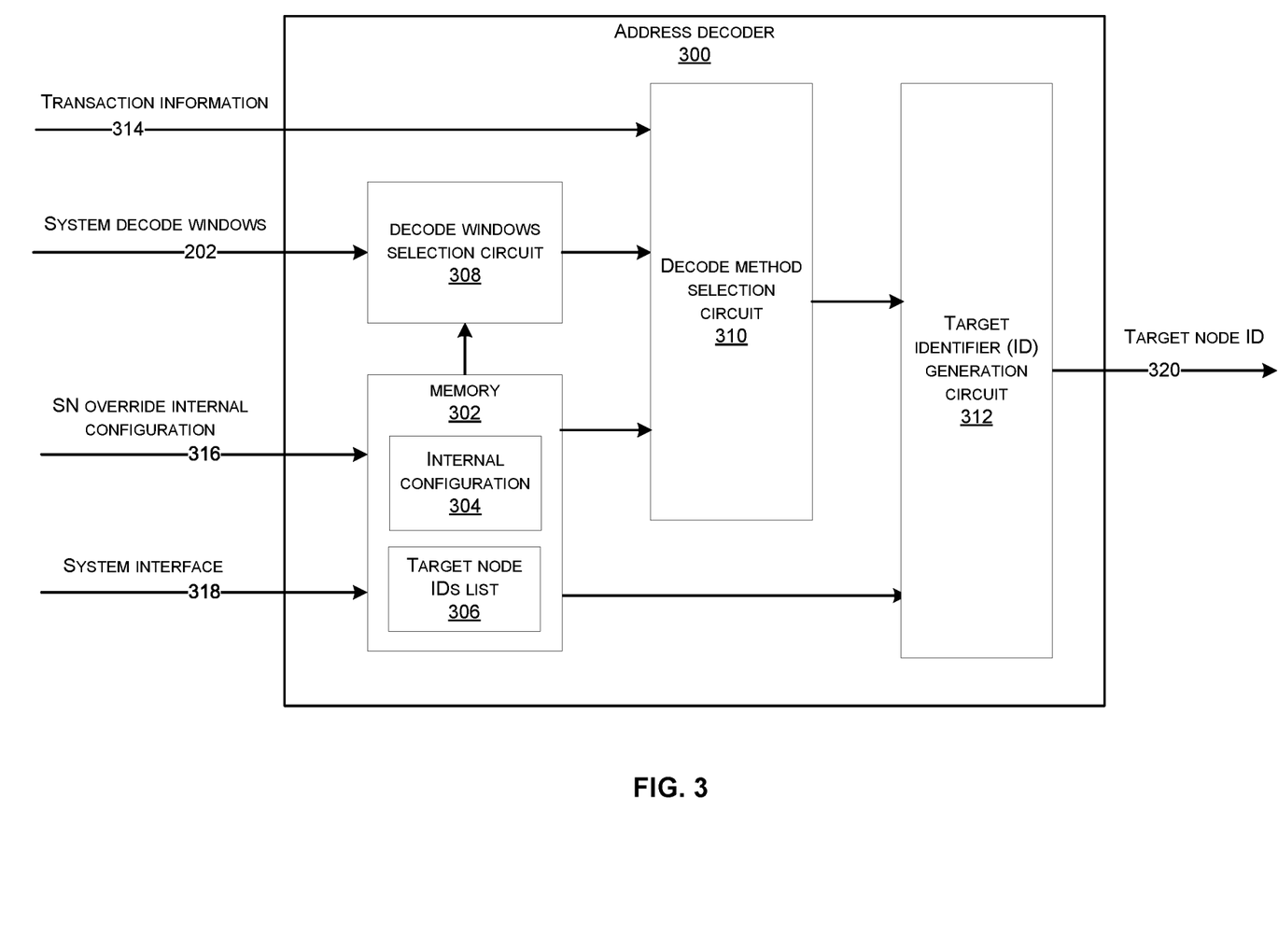
FIG. 3 illustrates an example block diagram for an address decoder, in some embodiments.

FIG. 3 illustrates an example block diagram for an address decoder 300, in some embodiments. As an example, the address decoder 300 can be instantiated for each of the address decoders 132-144 in FIG. 1. The address decoder 300 may include an integrated circuit comprising a memory 302, a decode windows selection circuit 308, a decode method selection circuit 310, and a target identifier (ID) generation circuit 312.

The memory 302 may be configured to store an internal configuration 304 and a target node IDs list 306. The internal configuration 304 and the target node IDs list 306 for the address decoder 300 can be configured using a system interface 318. The memory 302 can be implemented using registers, an SRAM, or any suitable type of memory or storage. In some implementations, the system 100 may also include a host processor, which may be configured to execute instructions to configure each address decoder in the system 100 using the corresponding system interface 318. However, in a complex system comprising a large number of address decoders, configuring each address decoder by software can be a time-consuming task. Some embodiments can be used to eliminate configuring each address decoder after reset by overwriting the default internal configuration of each address decoder in hardware using an external input. In some implementations, a signal for an SN override internal configuration 316 can be used to overwrite the default internal configuration 304 of each address decoder instance with the override values that are specific to the source node associated with that address decoder instance. The internal configuration 304 may include a plurality of configuration registers, which can be used to configure each address decoder instance. Referring back to FIG. 2, the SN1 override internal configuration 208a and the SNm override internal configuration 208m can be examples of the SN override internal configuration 316, which can have certain values for the address decoder 204a, and different values for the address decoder 204m, respectively.

Figure 4A:
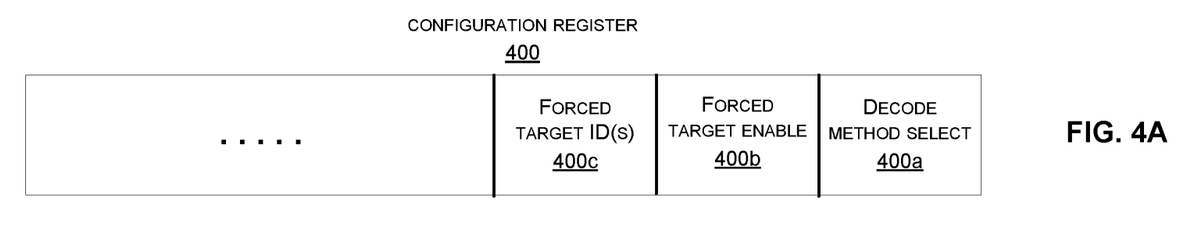
FIG. 4A illustrates an example configuration register in some embodiments.

In some implementations, the internal configuration 304 may include a configuration register 400 as shown in FIG. 4A. The example configuration register 400 may include a decode method select 400a, a forced target enable 400b, and forced target IDs 400c. The decode method select 400a can be used to select a decode method from a plurality of decode methods supported by the address decoder 300. For example, a value of 0 for the decode method select 400a may indicate a first decode method, and a value of 1 for the decode method select 400a may indicate a second decode method. The forced target enable 400b can be used to enable or disable use of a dedicated target node. The forced target IDs 400c can include one or more target node IDs, which can be used by a corresponding interconnect to route a transaction to a dedicated target node.

Figure 4B:
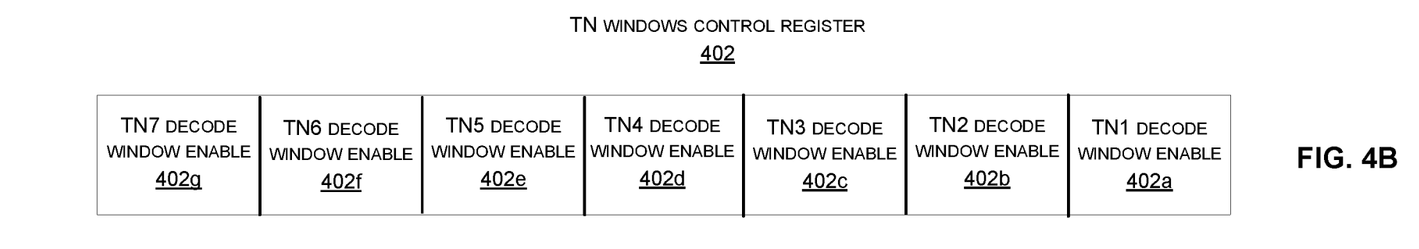
FIG. 4B illustrates an example target node windows control register in some embodiments.

The internal configuration 304 may also include a TN windows control register 402 as shown in FIG. 4B. The TN windows control register 402 may include a respective bit which can be used to enable or disable each decode window corresponding to the plurality of target nodes in the system. For example, a TN1 decode window enable bit 402a can be configured to enable or disable a decode window corresponding to the TN1 118, a TN2 decode window enable bit 402b can be configured to enable or disable a decode window corresponding to the TN2 120, a TN3 decode window enable bit 402c can be configured to enable or disable a decode window corresponding to the TN3 122, a TN4 decode window enable bit 402d can be configured to enable or disable a decode window corresponding to the TN4 124, a TN5 decode window enable bit 402e can be configured to enable or disable a decode window corresponding to the TN5 126, a TN6 decode window enable bit 402f can be configured to enable or disable a decode window corresponding to the TN6 128, and a TN7 decode window enable bit 402g can be configured to enable or disable a decode window corresponding to the TN7 130.

Figure 4C:
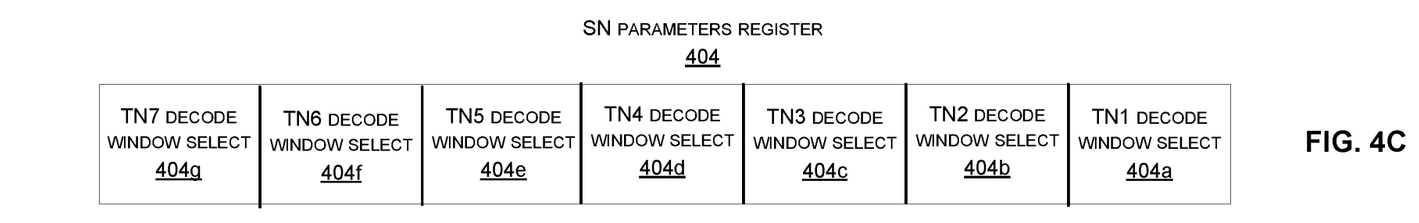
FIG. 4C illustrates an example source node parameters register in some embodiments.

The internal configuration 304 may also include an SN parameters register 404 as shown in FIG. 4C. The SN parameters register 404 may store a respective bit, which can be used to select a decode window from a plurality of decode windows corresponding to the plurality of target nodes. For example, the SN parameters register 404 for an address decoder instance can be used to select a set of decode windows from the system decode windows 202 that a corresponding source node is allowed to access. In some embodiments, the SN parameters register 404 can be used to select only the decode windows that are enabled, as controlled by the TN windows control register 402. In some embodiments, a set of decode windows can be enabled for all the address decoders using the TN windows control register 402; however, only a subset of the enabled decode windows can be selected for each address decoder. A TN1 decode window select bit 404a can be configured to select a decode window corresponding to the TN1 118, a TN2 decode window select bit 402b can be configured to select a decode window corresponding to the TN2 120, a TN3 decode window select bit 402c can be configured to select a decode window corresponding to the TN3 122, a TN4 decode window select bit 402d can be configured to select a decode window corresponding to the TN4 124, a TN5 decode window select bit 402e can be configured to select a decode window corresponding to the TN5 126, a TN6 decode window enable bit 402f can be configured to select a decode window corresponding to the TN6 128, and a TN7 decode window select bit 402g can be configured to select a decode window corresponding to the TN7 130.

Figure 5A:
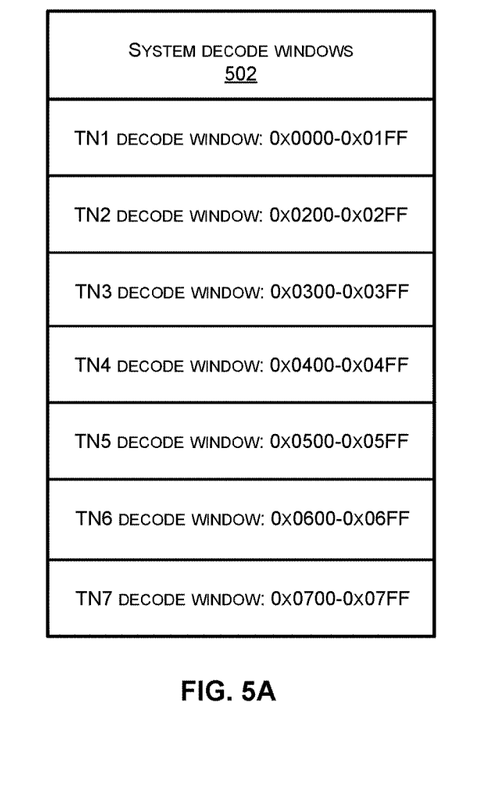
FIG. 5A illustrates an example of system decode windows in some embodiments.

The SN parameters register 404 can be used by the decode windows selection circuit 308 in FIG. 3 to select a set of decode windows from the system decode windows 202. FIG. 5A illustrates an example of the system decode windows 502, which includes a respective decode window representing an address range associated with each of the target nodes 118-130 in FIG. 1. The system decode windows 502 can be an example of the system decode windows 202. The system decode windows 502 may include a TN1 decode window representing an address range associated with the TN1 118, a TN2 decode window representing an address range associated with the TN2 120, a TN3 decode window representing an address range associated with the TN3 122, a TN4 decode window representing an address range associated with the TN4 124, a TN5 decode window representing an address range associated with the TN5 126, a TN6 decode window representing an address range associated with the TN6 128, and a TN7 decode window representing an address range associated with the TN7 130. In some embodiments, the system decode windows 502 may include a respective start address and a window size for each decode window instead of an address range.

Figure 5B:
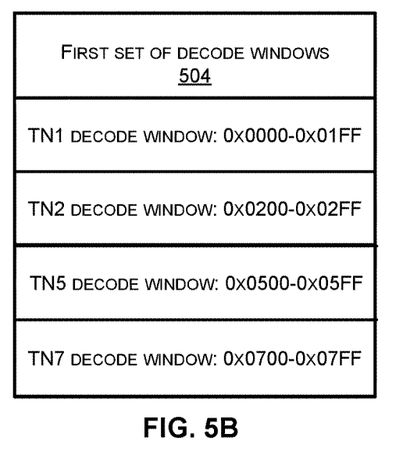
FIG. 5B illustrates an example first set of decode windows in some embodiments.

Each decode window in the system decode windows 502 can be enabled or disabled using a corresponding bit in the TN windows control register 402, as described with reference to FIG. 4B. As an example, the SN1 106 may have access to the TN1 118, TN2 120, TN5 126, and the TN7 130. The SN parameters register 404 for the address decoder 132 may be configured to select a first set of decode windows 504 corresponding to the TN1 118, the TN2 120, TN5 126, and the TN7 130. For example, each of the TN1 decode window select 404a, the TN2 decode window select 404b, the TN5 decode window select 404e, and the TN7 decode window select 404g can be set to 1 to select the first set of decode windows 504 corresponding to the TN1 118, TN2 120, TN5 126, and the TN7 130, as shown in FIG. 5B.

Figure 5C:
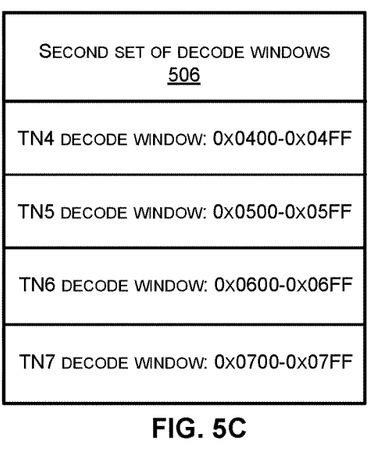
FIG. 5C illustrates an example second set of decode windows in some embodiments.

As an example, the SN5 114 may have access to the TN4 124, TN5 126, TN6 128, and the TN7 130. The SN parameters register 404 for the address decoder 140 may be configured to select a second set of decode windows 506 corresponding to the TN4 124, TN5 126, TN6 128, and the TN7 130. For example, each of the TN4 decode window select 404d, the TN5 decode window select 404e, the TN6 decode window select 404f, and the TN7 decode window select 404g can be set to 1 to select the second set of decode windows 506 corresponding to the TN4 124, TN5 126, TN6 128, and the TN7 130, as shown in FIG. 5C. Referring back to FIG. 3, the decode windows selection circuit 310 may select the first set of decode windows 504 from the system decode windows 202 for the address decoder 130, and the second set of decode windows 506 from the system decode windows 202 for the address decoder 140 based on the inputs from the respective SN parameters registers 404.

Referring back to FIG. 3, the decode method selection circuit 310 may be configured to select a decode method to determine a target node for a transaction issued by the source node associated with the address decoder 300. The decode method selection circuit 310 may be configured to select a decode method from a plurality of decode methods based on the decode method select 400a in the configuration register 400. As an example, when the decode method select 400a is 0, the decode method selection circuit 310 may select the first decode method, and when the decode method select 400a is 1, the decode method selection circuit 310 may select the second decode method.

The first decode method may include determining the target node for the transaction by determining whether a destination address of the transaction corresponds to a decode window from the set of decode windows. For example, the address decoder 300 may receive the destination address of the transaction as part of transaction information 314. The decode method selection circuit 310 may compare the destination address of the transaction with the respective decode window associated with each target node that the source node is allowed to access, and determine the target node when there is a match on one of the decode windows.

The second decode method may include assigning a dedicated target node as the target node irrespective of the destination address of the transaction. In some embodiments, the dedicated target node may be indicated in the transaction information 314. For example, in some embodiments, the dedicated target node may correspond to a predetermined memory space, which may be used for testing or verification operations. The decode method selection circuit 306 may determine the target node corresponding to the dedicated target node based on an indication in the transaction information 314 and whether the forced target enable bit 400b is set. In some embodiments, if the AXI protocol is used for communication between the source nodes and the target nodes in the system 100, the transaction information 314 may include AXI USER bits, and information associated with the dedicated target node can be indicated in the AXI USER bits.

The target ID generation circuit 312 may be configured to generate a target node ID 320 for the target node determined by the selected decode method. For example, the target node may be determined by the decode method selection circuit 310 using the first decode method or the second decode method. The target node ID 320 can be associated with an interconnect, and can be used to route the transaction to the target node via that interconnect. In some implementations, the target ID generation circuit 312 may assign the target node ID based on the target node IDs list 306. As an example, the target node IDs list 306 may include a first set of target node IDs associated with the first interconnect 102 as shown in FIG. 5D, and a second set of target node IDs associated with the second interconnect 104 as shown in FIG. 5E.

Figure 5D:
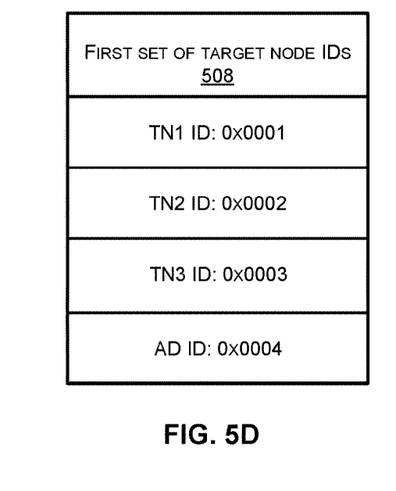
FIG. 5D illustrates an example first set of target node identifiers (IDs) in some embodiments.

FIG. 5D shows a first set of target node IDs 508 comprising a TN1 ID associated with the TN1 118, a TN2 ID associated with the TN2 120, a TN3 ID associated with the TN3 122, and an address decoder (AD) ID associated with the address decoder 144. In some implementations, a transaction that is directed to any of the target nodes 124-130, can be assigned the AD ID so that the first interconnect 102 can route the transaction to the address decoder 144. The target ID generation circuit 312 in the address decoder 144 can generate a target node ID 320 based on a second set of target node IDs, as described with reference to FIG. 5E. In some embodiments, the AD ID can be one of the target node IDs, based on the implementation.

Figure 5E:
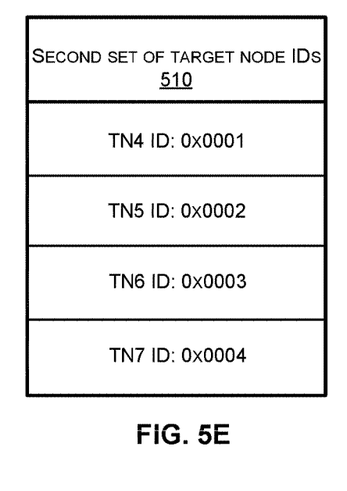
FIG. 5E illustrates an example second set of target node IDs in some embodiments.

FIG. 5E shows a second set of target node IDs 510 comprising a TN4 ID associated with the TN4 124, a TN5 ID associated with the TN5 120, a TN6 ID associated with the TN6 122, and a TN7 ID associated with the TN2 120. The target node ID 320 generated by the address decoder 144 can be used by the second interconnect 104 to route the transaction to the target node from the target nodes 124-130, where the transaction is addressed to.

In some embodiments, the target ID generation circuit 312 may assign the target node ID 320 corresponding to a dedicate target node for the second decode method. The target ID generation circuit 312 may assign the dedicated target node as the target node based on the transaction information 314, irrespective of the destination address of the transaction. For example, referring back to FIG. 1, if the transaction from the SN1 106 is addressed to the TN2 120, and the transaction information 314 indicates that the transaction has to be routed to the TN6 128, instead of assigning the target node ID 320 as 0x0002 to route the transaction to the TN2 120, the target ID generation circuit 312 in the address decoder 132 may assign the target node ID 320 as 0x0004 so that the first interconnect 102 can route the transaction to the address decoder 144. The target ID generation circuit 312 in the address decoder 144 may assign the target node ID 320 as 0x0003 so that the second interconnect 104 can route the transaction to the TN6 128. In some embodiments, the target node IDs assigned to the dedicated target nodes can be determined based on the forced target ID 400c. For example, the forced target ID 400c can be set to 0x0004 in the configuration register 400 for the address decoder 132, and the forced target ID 400c can be set to 0x0003 in the configuration register 400 for the address decoder 144.

Figure 6:
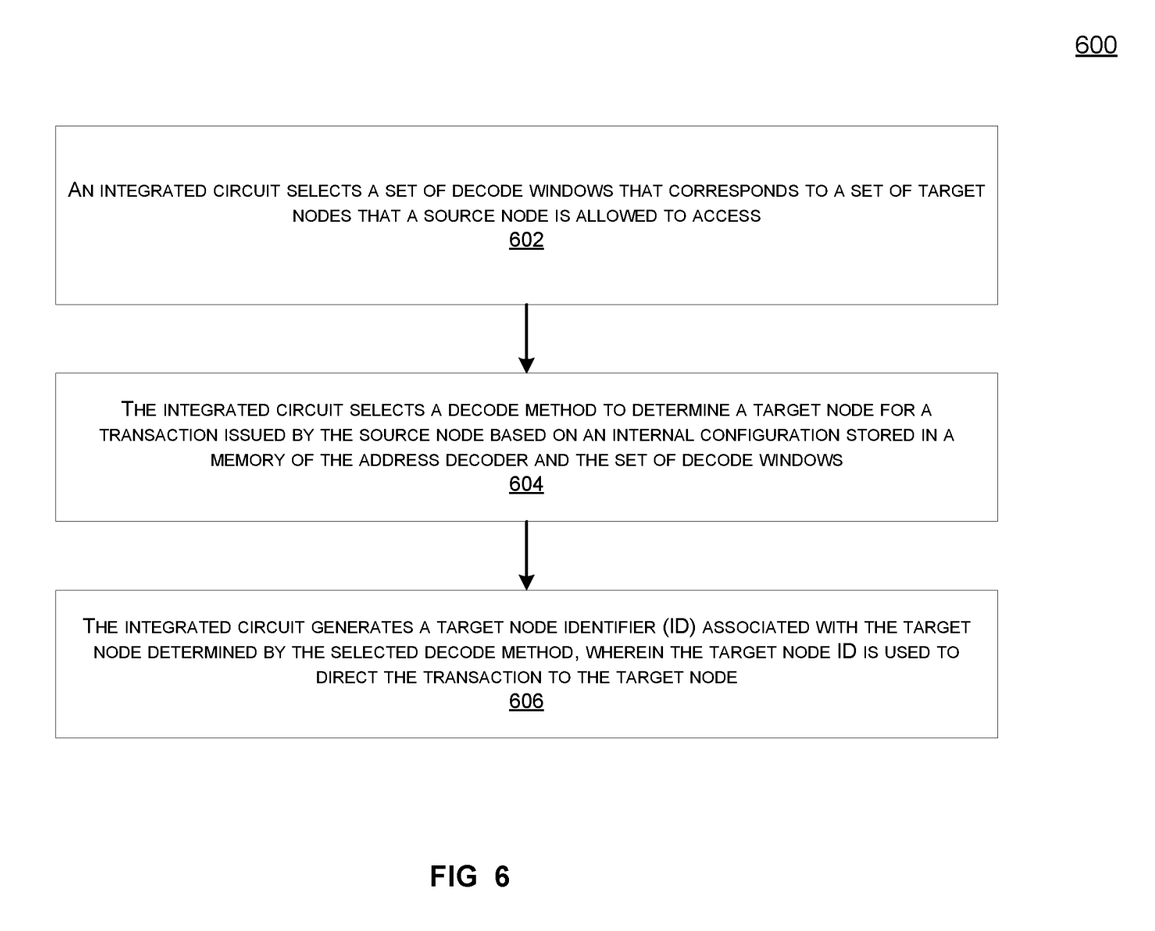
FIG. 6 illustrates a flow chart for a method performed by an integrated circuit, according to some embodiments.

FIG. 6 illustrates a flow chart 600 for a method performed by an integrated circuit, according to some embodiments. The integrated circuit may correspond to an address decoder associated with a source node in a system comprising a plurality of source nodes and a plurality of target nodes. The address decoder can be one of a plurality of address decoders associated with the plurality of source nodes in the system. The method can be performed by any of the address decoders 132-144 of the system 100. As an example, the method may be performed by the address decoder 132 associated with the SN1 106.

In step 602, the integrated circuit may select a set of decode windows that correspond to a set of target nodes that the source node is allowed to access. The set of decode windows can be selected from a plurality of decode windows. Each decode window in the plurality of decode windows may represent an address range associated with a corresponding target node from a plurality of target nodes. For example, the decode windows selection circuit 308 may select the first set of decode windows 504 from the system decode windows 502 based on the SN parameters register 404 for the address decoder 132.

In step 604, the integrated circuit may select a decode method to determine a target node for a transaction issued by the source node based on an internal configuration stored in a memory of the address decoder, and the set of decode windows. As discussed previously with FIGS. 2-3, the internal configuration 304 stored in the memory 302 of the address decoder 132 may be an override internal configuration specific to the SN1 106, which may have replaced the default internal configuration of the address decoder 132 at reset. The internal configuration 304 stored in the memory 302 may indicate a first decode method in the configuration register 400. As an example, the transaction issued by the address decoder 132 may include a destination address equal to 0x0550. The decode method selection circuit 310 may determine that the destination address corresponds to the TN5 decode window from the first set of decode windows 504, which corresponds to the TN5 126.

In step 606, the integrated circuit may generate a target node ID associated with the target node determined by the selected decode method. The target node ID may be used to direct the transaction to the target node. The target ID generation circuit 312 may generate the target node ID 320 equal to 0x0004, which can be used by the first interconnect 102 to route the transaction to the address decoder 144. The decode windows selection circuit 308 in the address decoder 144 may select the second set of decode windows 504 from the system decode windows 502 based on the SN parameters register 404 for the address decoder 144. The internal configuration stored in the memory 302 for the address decoder 144 may indicate a first decode method. The decode method selection circuit 310 for the address decoder 144 may determine that 0x0550 corresponds to the TN5 decode window from the second set of decode windows 504, which is associated with the TN5 126. The target ID generation circuit 312 for the address decoder 144 may generate the target node ID 320 equal to 0x0002, which can be used by the second interconnect 104 to direct the transaction to the TN5 126.

In some examples, if the forced target enable bit 400b is set, the target ID generation circuit 312 may assign the target node ID 320 based on the forced target ID 400c, instead of 0x0002. For example, the forced target ID 400c may include a target node ID equal to 0x0003, which corresponds to TN6 128. In this case, the second interconnect 104 may route the transaction to the TN6 128 instead of TN5 126.

Thus, instead of a dedicated address decoder for each of the source nodes, the embodiments can provide flexibility in using the same address decoder across the system for all the source nodes. Each address decoder can be configured with a specific decode method using an external configuration that can be common to all the address decoders, and an internal configuration that can be specific to the address decoder based on the corresponding source node. Furthermore, having a simpler and a smaller design of the address decoder can help contain the chip area, and minimize the verification efforts.

Figure 7:
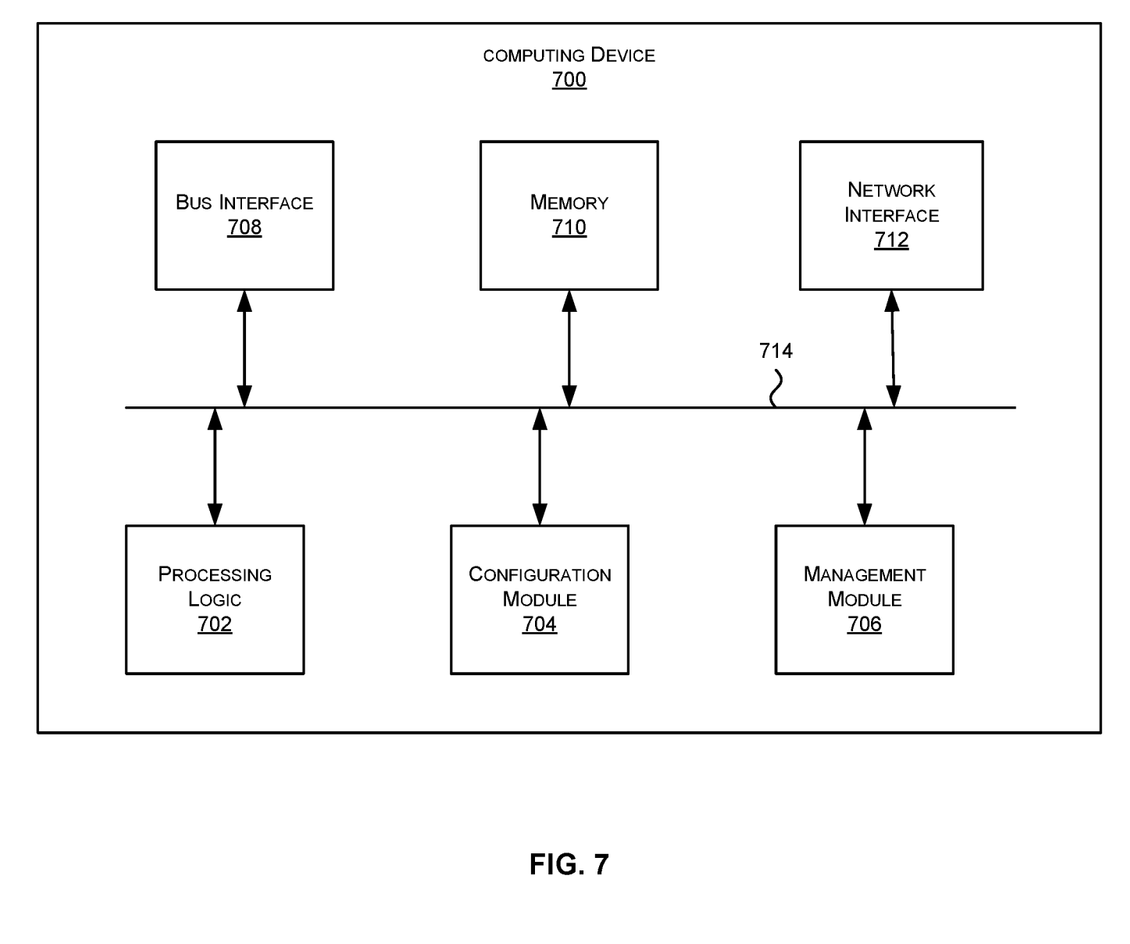
FIG. 7 illustrates an example of a computing device, according to certain aspects of the disclosure.

FIG. 7 illustrates an example of a computing device 700. Functionality and/or several components of the computing device 700 may be used without limitation with other embodiments disclosed elsewhere in this disclosure, without limitations. As an example, the system 100 can be part of the computing device 700. The computing device 700 may facilitate processing of packets and/or forwarding of packets from the computing device 700 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 700 may be the recipient and/or generator of packets. In some implementations, the computing device 700 may modify the contents of the packet before forwarding the packet to another device. The computing device 700 may be a peripheral device coupled to another computer device, a switch, a router or any other suitable device enabled for receiving and forwarding packets.

In one example, the computing device 700 may include processing logic 702, a configuration module 704, a management module 706, a bus interface module 708, memory 710, and a network interface module 712. These modules may be hardware modules, software modules, or a combination of hardware and software. In certain instances, modules may be interchangeably used with components or engines, without deviating from the scope of the disclosure. The computing device 700 may include additional modules, which are not illustrated here. In some implementations, the computing device 700 may include fewer modules. In some implementations, one or more of the modules may be combined into one module. One or more of the modules may be in communication with each other over a communication channel 714. The communication channel 714 may include one or more busses, meshes, matrices, fabrics, a combination of these communication channels, or some other suitable communication channel.

The processing logic 702 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 702 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 702 may be stored on a computer-readable storage medium, for example, in the form of a computer program. The computer-readable storage medium may be non-transitory. In some cases, the computer-readable medium may be part of the memory 710.

The memory 710 may include either volatile or non-volatile, or both volatile and non-volatile types of memory. The memory 710 may, for example, include random access memory (RAM), read only memory (ROM), Electrically Erasable Programmable Read-Only Memory (EEPROM), flash memory, and/or some other suitable storage media. In some cases, some or all of the memory 710 may be internal to the computing device 700, while in other cases some or all of the memory may be external to the computing device 700. The memory 710 may store an operating system comprising executable instructions that, when executed by the processing logic 702, provides the execution environment for executing instructions providing networking functionality for the computing device 700. The memory may also store and maintain several data structures and routing tables for facilitating the functionality of the computing device 700.

In some implementations, the configuration module 704 may include one or more configuration registers. Configuration registers may control the operations of the computing device 700. In some implementations, one or more bits in the configuration register can represent certain capabilities of the computing device 700. Configuration registers may be programmed by instructions executing in the processing logic 702, and/or by an external entity, such as a host device, an operating system executing on a host device, and/or a remote device. The configuration module 704 may further include hardware and/or software that control the operations of the computing device 700.

In some implementations, the management module 706 may be configured to manage different components of the computing device 700. In some cases, the management module 706 may configure one or more bits in one or more configuration registers at power up, to enable or disable certain capabilities of the computing device 700. In certain implementations, the management module 706 may use processing resources from the processing logic 702. In other implementations, the management module 706 may have processing logic similar to the processing logic 702, but segmented away or implemented on a different power plane than the processing logic 702.

The bus interface module 708 may enable communication with external entities, such as a host device and/or other components in a computing system, over an external communication medium. The bus interface module 708 may include a physical interface for connecting to a cable, socket, port, or other connection to the external communication medium. The bus interface module 708 may further include hardware and/or software to manage incoming and outgoing transactions. The bus interface module 708 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 708 may include the physical layer for any of these bus protocols, including a connector, power management, and error handling, among other things. In some implementations, the computing device 700 may include multiple bus interface modules for communicating with multiple external entities. These multiple bus interface modules may implement the same local bus protocol, different local bus protocols, or a combination of the same and different bus protocols.

The network interface module 712 may include hardware and/or software for communicating with a network. This network interface module 712 may, for example, include physical connectors or physical ports for wired connection to a network, and/or antennas for wireless communication to a network. The network interface module 712 may further include hardware and/or software configured to implement a network protocol stack. The network interface module 712 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 700 may include multiple network interface modules, each configured to communicate with a different network. For example, in these implementations, the computing device 700 may include a network interface module for communicating with a wired Ethernet network, a wireless 802.11 network, a cellular network, an Infiniband network, etc.

The various components and modules of the computing device 700, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 7, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a plurality of source nodes configured to issue transactions;
   a plurality of address decoders, each address decoder associated with a respective source node from the plurality of source nodes;
   one or more interconnects coupled to the plurality of address decoders; and
   a plurality of target nodes coupled to the one or more interconnects,
   wherein each address decoder from the plurality of address decoders comprises:
      a memory configured to store an internal configuration for the address decoder;
      a decode windows selection circuit coupled to the memory, and having a decode windows selection circuit output configured to output a set of decode windows based on the internal configuration, wherein the set of decode windows corresponds to a set of target nodes in the plurality of target nodes that a source node associated with a given address decoder is allowed to access;
      a decode method selection circuit coupled to the memory, and having a decode method selection circuit output configured to output a determination of a target node associated with a decode method for a transaction issued by the source node based on the internal configuration and the set of decode windows; and
      a target identifier (ID) generation circuit coupled to the memory and the decode method selection circuit, and having a target ID generation circuit output configured to output a target node ID associated with the target node of the decode method, wherein the target node ID is used to route the transaction to the target node, and
   wherein the one or more interconnects are configured to direct the transaction to the target node based on the target node ID.

2. The system of claim 1, wherein a default configuration stored in the memory of each address decoder is overwritten in hardware at reset of the system with an override configuration associated with the source node for the given address decoder, and wherein the internal configuration used by the decode method selection circuit is the override configuration.

3. The system of claim 1, wherein the decode method is one of a plurality of decode methods, and wherein the plurality of decode methods includes a first decode method that outputs the determination of the target node based on a destination address of the transaction being within a decode window from the set of decode windows.

4. The system of claim 3, wherein the plurality of decode methods includes a second decode method associated with a dedicated target node that is used as the target node irrespective of the destination address of the transaction.

5. An integrated circuit, comprising:
   a decode windows selection circuit configured to output a set of decode windows that corresponds to a set of target nodes that a source node is allowed to access;

a decode method selection circuit coupled to the decode windows selection circuit, and configured to output a determination of a target node associated with a decode method for a transaction issued by the source node based on an internal configuration stored in a memory of the integrated circuit, and based on the set of decode windows; and a target identifier (ID) generation circuit coupled to the decode method selection circuit, and configured to output a target node ID associated with the target node of the decode method, wherein the target node ID is used to route the transaction to the target node.

6. The integrated circuit of claim 5, wherein the integrated circuit corresponds to an address decoder associated with the source node in a system, and wherein the address decoder is one of a plurality of address decoders associated with source nodes in the system.

7. The integrated circuit of claim 5, wherein at reset of the integrated circuit, a default configuration stored in the memory of the integrated circuit is replaced with an override internal configuration associated with the source node.

8. The integrated circuit of claim 5, wherein the target node ID is used by an interconnect coupled to the integrated circuit and coupled to the target node to route the transaction to the target node.

9. The integrated circuit of claim 5, wherein the decode method is one of a plurality of decode methods.

10. The integrated circuit of claim 9, wherein the plurality of decode methods includes a first decode method that outputs the determination of the target node based on a destination address of the transaction corresponding to a decode window from the set of decode windows.

11. The integrated circuit of claim 9, wherein the plurality of decode methods includes a second decode method associated with a dedicated target node that is used as the target node irrespective of a destination address of the transaction.

12. The integrated circuit of claim 11, wherein the transaction is issued using an Advanced extensible Interface (AXI) protocol and transaction information of the transaction includes AXI USER bits, and wherein the dedicated target node is assigned based on the AXI USER bits.

13. The integrated circuit of claim 5, wherein the target ID generation circuit is further configured to override the target node ID based on an indication in the internal configuration irrespective of the decode method.

14. The integrated circuit of claim 5, wherein the set of decode windows is one of a plurality of decode windows, and wherein each decode window in the plurality of decode windows represents an address range associated with a corresponding target node from a plurality of target nodes.

15. The integrated circuit of claim 14, wherein the decode windows selection circuit is configured to output the set of decode windows from the plurality of decode windows based on a set of parameters associated with the source node.

16. The integrated circuit of claim 5, wherein the source node is coupled to the target node via a plurality of interconnects.

17. The integrated circuit of claim 16, wherein a first interconnect in the plurality of interconnects is coupled to a second interconnect in the plurality of interconnects via an interconnect address decoder.

18. The integrated circuit of claim 17, wherein the target node ID identifies the interconnect address decoder.

19. The integrated circuit of claim 5, wherein the internal configuration includes a target node windows control register storing decode window enable bits.

20. The integrated circuit of claim 5, wherein the internal configuration includes a source node parameters register storing decode window selection bits.

* * * * *